US012353381B2

(12) United States Patent
Oliveira Lizardo et al.

(10) Patent No.: US 12,353,381 B2
(45) Date of Patent: Jul. 8, 2025

(54) LARGE OBJECT DATA TYPE SUPPORT FOR COLUMN-BASED DATABASE SYSTEM

(71) Applicant: International Business Machines Corporation, Armonk, NY (US)

(72) Inventors: Luis Eduardo Oliveira Lizardo, Böblingen (DE); Johannes Severin Kern, Boeblingen (DE); Mehmet Cuneyt Goksu, Schonaich (DE); Daniel Martin, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/813,501

(22) Filed: Jul. 19, 2022

(65) Prior Publication Data

US 2023/0060702 A1 Mar. 2, 2023

(30) Foreign Application Priority Data

Aug. 30, 2021 (EP) ..................................... 21193863

(51) Int. Cl.
*G06F 16/22* (2019.01)
*G06F 16/25* (2019.01)

(52) U.S. Cl.
CPC ........ *G06F 16/2219* (2019.01); *G06F 16/221* (2019.01); *G06F 16/254* (2019.01)

(58) Field of Classification Search
None
See application file for complete search history.

(56) References Cited

U.S. PATENT DOCUMENTS

2006/0212465 A1* 9/2006 Fish .................... G06F 11/1662
2010/0094838 A1* 4/2010 Kozak ................. G06F 16/2443
707/705

(Continued)

FOREIGN PATENT DOCUMENTS

CN 112000666 A 11/2020

OTHER PUBLICATIONS

Anonymous, "System and Method for Accelerating Spatial Operations," https://priorart.ip.com/IPCOM/000240606, IP.com Prior Art Database Technical Disclosure, IP.com No. IPCOM000240606D, Feb. 12, 2015, 11 pgs.

(Continued)

*Primary Examiner* — Neveen Abel Jalil
*Assistant Examiner* — John J Morris
(74) *Attorney, Agent, or Firm* — Kelsey Skodje (57) ABSTRACT

A method for processing an unsupported data type in a database is disclosed. The method for processing an unsupported data type in a database comprises detecting, while copying data from a primary to a secondary database, a table for data comprising a data type that is unsupported by the secondary database. Furthermore, the method comprises generating a base table in the secondary database as a copy of the detected table of the primary database without the data of the unsupported data type, generating an additional table in the secondary database for data of the unsupported data type, and linking the additional table to the base table in the secondary database via a row-identifier relationship. Additionally, the method comprises accessing data of the unsupported data type via the additional table while performing queries against the secondary database.

19 Claims, 5 Drawing Sheets

(56) References Cited

U.S. PATENT DOCUMENTS

| | | | |
|---|---|---|---|
| 2015/0039587 A1 | 2/2015 | Liu et al. | |
| 2016/0110439 A1* | 4/2016 | Hrle | G06F 16/2358 |
| | | | 707/600 |
| 2016/0342350 A1* | 11/2016 | Shoultz | G06F 3/0647 |
| 2017/0147664 A1* | 5/2017 | Bussler | G06F 16/22 |
| 2018/0189370 A1* | 7/2018 | Bendel | G06F 16/27 |
| 2020/0034365 A1* | 1/2020 | Martin | G06F 16/24554 |
| 2020/0099764 A1 | 3/2020 | Bailey et al. | |
| 2020/0104052 A1 | 4/2020 | Vijayan et al. | |
| 2021/0109933 A1* | 4/2021 | Frantz | G06F 16/221 |
| 2022/0188325 A1* | 6/2022 | Galanis | G06F 16/24524 |

OTHER PUBLICATIONS

IBM, "IBM Db2 Analytics Accelerator for z/OS," https://www.ibm.com/products/db2-analytics-accelerator, printed Apr. 21, 2022, 4 pgs.

Lizardo et al., "A PostGIS extension to support advanced spatial data types and integrity constraints," In Proceedings of SIGSPATIAL'17, Los Angeles Area, CA, USA, Nov. 7-10, 2017, 10 pgs., https://doi.org/10.1145/3139958.3140020.

Oliveira Lizardo et al., "Large Object Data Type Support for Column-Based Database System," Application No. 21193863.4, filed Aug. 30, 2021.

The Data School, "Row vs Column Oriented Databases," https://dataschool.com/data-modeling-101/row-vs-column-oriented-databases/, last modified Aug. 9, 2021, 8 pgs.

Unknown, "Azure Data Factory & XML: Loading unsupported file types," https://blog.coeo.com/azure-data-factory-XML-loading-unsupported-file-types, accessed Apr. 21, 2022, 6 pgs.

* cited by examiner

LARGE OBJECT DATA TYPE SUPPORT FOR COLUMN-BASED DATABASE SYSTEM

BACKGROUND

The invention relates generally to a computer-implemented method for processing an unsupported data type in a column-oriented database. The invention relates further to a related data management system, and a computer program product.

Proper data management remains one of the hot topics in IT (information technology) departments. Although there is a trend towards storing more and more data on cloud computing systems, customers with sensitive data, especially in regulated industries, are following the hybrid cloud approach, with the consequence that also many data remain on premise. Additionally, the requirement of data analytics—although being a mainstream technology for many years—is becoming more sophisticated and more widely used across departments and as part of the business processes. Hence, it has become common to differentiate data management between online transaction processing (OLTP) data and online analytical processing (OLAP) data. In order to manage the data consistently, however, OLTP and OLAP systems are often integrated and enabled to manage data consistently and with a user interface or a common API (Application Programming Interface).

SUMMARY

According to one aspect of the present invention, a computer-implemented method for processing an unsupported data type in a database may be provided. The method may comprise detecting, while copying data from a primary database to a secondary database, a table for data comprising a data type that is unsupported by the secondary database.

The method may further comprise generating a base table in the secondary database as a copy of the detected table of the primary database without the data of the unsupported data type, generating an additional table in the secondary database for data of the unsupported data type, and linking the additional table to the base table in the secondary database via a row-identifier relationship. Finally, the method may comprise accessing data of the unsupported data type via the additional table when performing queries against the secondary database comprising the base table.

According to another aspect of the present invention, a database management system for processing an unsupported data type in a database may be provided. The system may comprise a processor and a memory, communicatively coupled to the processor, wherein the memory stores program code portions that, when executed, enable the processor to detect, while copying data from a primary database to a secondary database, a table for data comprising a data type that is unsupported by the secondary database, generate a base table in the secondary database as a copy of the detected table of the primary database without the data of the unsupported data type, generate an additional table in the secondary database for data of the unsupported data type, link the additional table to the base table in the secondary database via a row-identifier relationship, and access, while performing queries against the secondary database comprising the base table, data of the unsupported data type via the additional table.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

Proper data management remains one of the hot topics in IT (information technology) departments. Although there is a trend towards storing more and more data on cloud computing systems, customers with sensitive data, especially in regulated industries, are following the hybrid cloud approach, with the consequence that also many data remain on premise. Additionally, the requirement of data analytics—although being a mainstream technology for many years—is becoming more sophisticated and more widely used across departments and as part of the business processes. Hence, it has become common to differentiate data management between online transaction processing (OLTP) data and online analytical processing (OLAP) data. In order to manage the data consistently, however, OLTP and OLAP systems are often integrated and enabled to manage data consistently and with a user interface or a common API (Application Programming Interface).

An example of such an integrated data management system is IBM's DB2® Analytical Accelerator, in which the data is managed in row-oriented database tables for all OLTP purposes, while the data required for OLTP purposes are managed in a column-oriented manner by the accelerator portion of the database management system (DBMS). Thereby, the accelerator is designed to improve the execution of OLAP queries against the DBMS.

The very nature of the integrated accelerator appliance may provide transparent integration between the underlying operating system (e.g., z/OS®). Thereby, the accelerator is not seen as another independent database but as an extension to the core or primary database. The maintenance and illustration tasks are carried out via the main database. Performance metrics can be included in traditional main database instruction facility and there is no additional user interface to learn. Both, isolation and integration are transparently exposed to end-users as well. No application changes are necessary to accelerate eligible queries.

Once an accelerator is installed and activated, the main database optimizer may treat the appliance as a new access path and will automatically offload SQL processing transparently when it is more efficient to do so. Not every query may be accelerated. Some queries may have incompatible SQL statements, or the main database optimizer may decide that offload is not the optimal choice.

Besides the mentioned example of DB2, also other databases may exist that are optimized for OLTP and OLAP workloads, mainly by implementing a row store for OLTP purposes and a column store for OLAP purposes.

In either case, one may encounter problems with supported data types that are supported by the row store and the column store. It may well happen that the column store does not support all data types supported by the row store.

In the context of this description, the following conventions, terms and/or expressions may be used:

The term "primary database" may denote a row-oriented database of the data management system, wherein the row-oriented database portion may be optimized for OLTP transactions.

The term "secondary database" may denote a column-oriented database of the data management system, wherein the column-oriented database portion may be optimized for OLAP queries. The access, maintenance, the optimization, and so on between the primary database and the secondary database may be performed by the data management system. The secondary database may in some cases be referred to as OLAP accelerator.

The term "additional table" may denote a second row-oriented database table in the column-oriented database table which may be generated when setting up the column store or during the process of copying data from the primary database to the secondary database. The additional table may hold those data types which are not supported in the column table of the column-oriented database. Additionally, there may be a 1:1 relationship between the base table and the column-oriented database and the additional (row-oriented) table. Hence, each table of the column-oriented database, which role-oriented equivalent in the row oriented database has data types that are not supported by the column store, may have such couple of base table and additional table in the column store.

The term "row-identifier relationship" may denote that the base table and the additional table of the secondary database are other using row identifiers (row ID) cross-reference-wise; i.e., each of the pairs of tables (i.e., related base table and additional table) may store additionally the row ID of the row of the other table's related entry. This is further detailed in FIG. 3.

The term "large object" may denote in general here data that is not supported by the columnar table.

The proposed computer-implemented method for processing an unsupported data type in a database may offer multiple advantages, technical effects, contributions and/or improvements:

A direct advantage is that those data types which can easily be managed in a row-oriented table of the transactional part of the data management system may now also become usable and accessible in the OLAP-oriented secondary database in which these so far unsupported data types could not have been managed and used. Examples of such data types are spatial data, XML data, JSON (JavaScript® Object Notation) data, or in general, LOB data (Large OBjects).

Hence, analytical processes may also be applied elegantly by the column-oriented secondary database of the data management system. Queries against such large object data may no longer be limited to the row-oriented portion of the data management system. This may further offload workloads from the transaction oriented primary database. This may support the better usage of available hardware resources because OLTP transaction may be performed faster—with a consequence of a better user experience—or with fewer hardware resources which may support sustainability efforts.

Furthermore, in some license models user may pay for the use of interactions with the primary database but not for the use of interactions with the secondary database. So, if a query could run in the secondary accelerator database, the user (i.e., customer) is not paying for the query against the second database because no MIPS (Million instructions per second) are measured for this.

Furthermore, an access to the additional table in the column-oriented database may be completely transparent to the administrator because the data management system may handle this additional complexity by auto-optimization.

In the following, additional embodiments of the inventive concept—applicable for the method as well as for the system—will be described.

According to one embodiment of the method, the unsupported data type may comprise XML-type data. According to another embodiment of the method, the unsupported data type may comprise spatial data. And, according to again another embodiment, the unsupported data type may comprise JSON data. In general, many other data types may be possible, i.e., the unsupported may generally be denotable as large object (LOB) data or BLOB (binary large objects). Some other examples may be PDF (portable document format) data spreadsheets, presentations data, text data, image data, as well as, any type of semi-structured data.

According to one preferred embodiment of the method, the primary database may be a row-oriented database. Hence, it may be optimized for transaction processing.

In a symmetrical way and according to another preferred embodiment of the method, the secondary database may be a column-oriented database with support for row-oriented tables. Consequently, the secondary database may primarily hold column-oriented tables and only in exceptional cases—in particular, if data types are not supported by the secondary database—a related row-oriented table may be added as additional table to the base table. In general, and according to a further embodiment, the secondary database may be OLAP optimized.

According to a special embodiment of the method, the primary database may be compatible with a z/Architecture® computer system. This architecture may typically be used in mainframe computer systems supporting large enterprises. There are optimized databases with a row store portion and a related column store portion between which not all data types are compatible. The method and system proposed here may close advantageously this technical gap.

According to an optional embodiment of the method, the secondary database may be compatible with one or more environments selected out of the group comprising Linux®, Unix® and Microsoft Windows®. Hence, a row store/column store of the proposed kind may be used in basically any computing combination of hardware architecture and operating system.

Last but not least, and according to a further useful embodiment, the primary database may be a row-oriented database which is optimized for OLAP processing.

In the following, a detailed description of the figures will be given. All instructions in the figures are schematic. Firstly, a block diagram of an embodiment of the inventive computer-implemented method for processing an unsupported data type in a database is given. Afterwards, further embodiments, as well as embodiments of the data management system for processing an unsupported data type in a database will be described.

Figure 1:
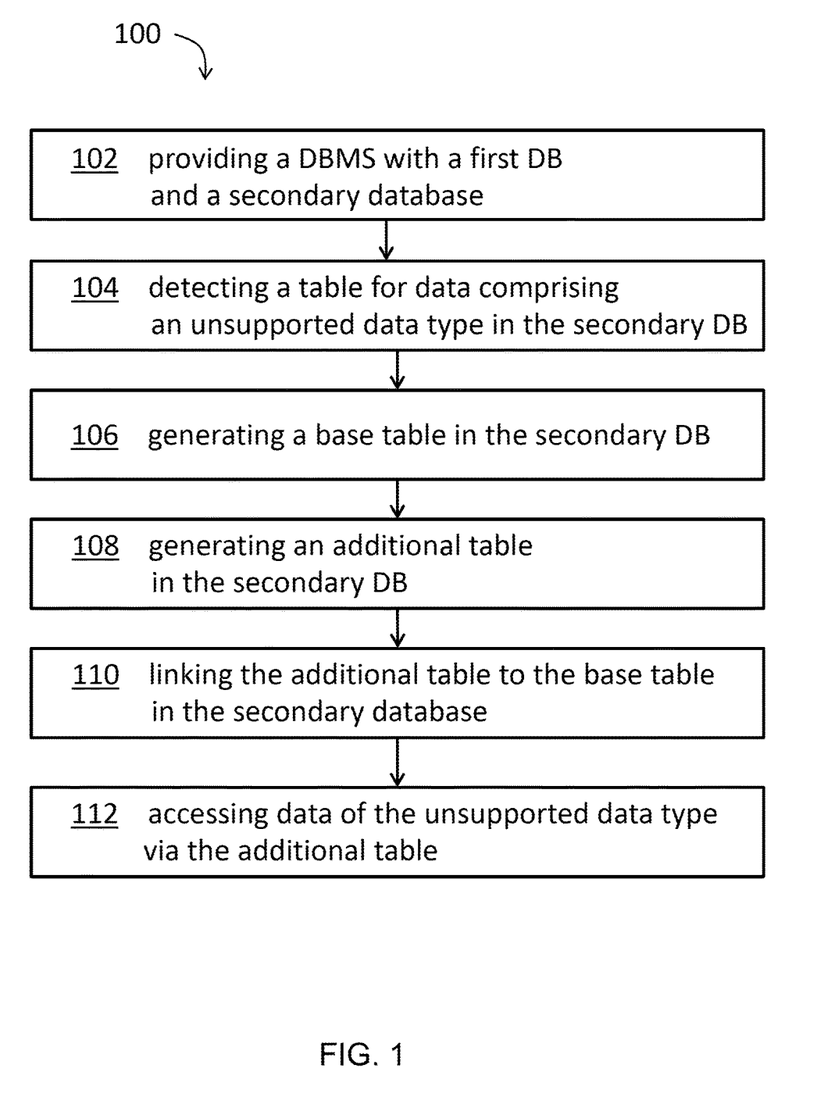
FIG. 1 shows a block diagram of an embodiment of the inventive computer-implemented method for processing an unsupported data type in a column-oriented database.

FIG. 1 shows a block diagram of a preferred embodiment of the computer-implemented method 100 for processing an unsupported data type in a database. The method comprises providing, 102, a database management system comprising at least a primary database and at least a secondary database, i.e., an OLAP accelerator. The method 100 further comprises detecting, 104, while copying data from the primary database to the secondary database, a table for data comprising a data type that is unsupported by the secondary database. Typically, unsupported data types may already be detected when defining the database tables, i.e., when defining second database layout and data structure. However, it may also be possible to create the additional data "on-the-fly".

Furthermore, the method 100 comprises generating, 106, a base table in the secondary database as a copy of the detected table of the first database without the data of the unsupported data type, generating, 108, an additional table in the secondary database for data of the unsupported data type, and linking, 110, the additional table to the base table in the secondary database via a row-identifier relationship. Finally, the method 100 comprises accessing, 112, data of the unsupported data type via the additional table while performing queries against the secondary database comprising the base table.

Figure 2:
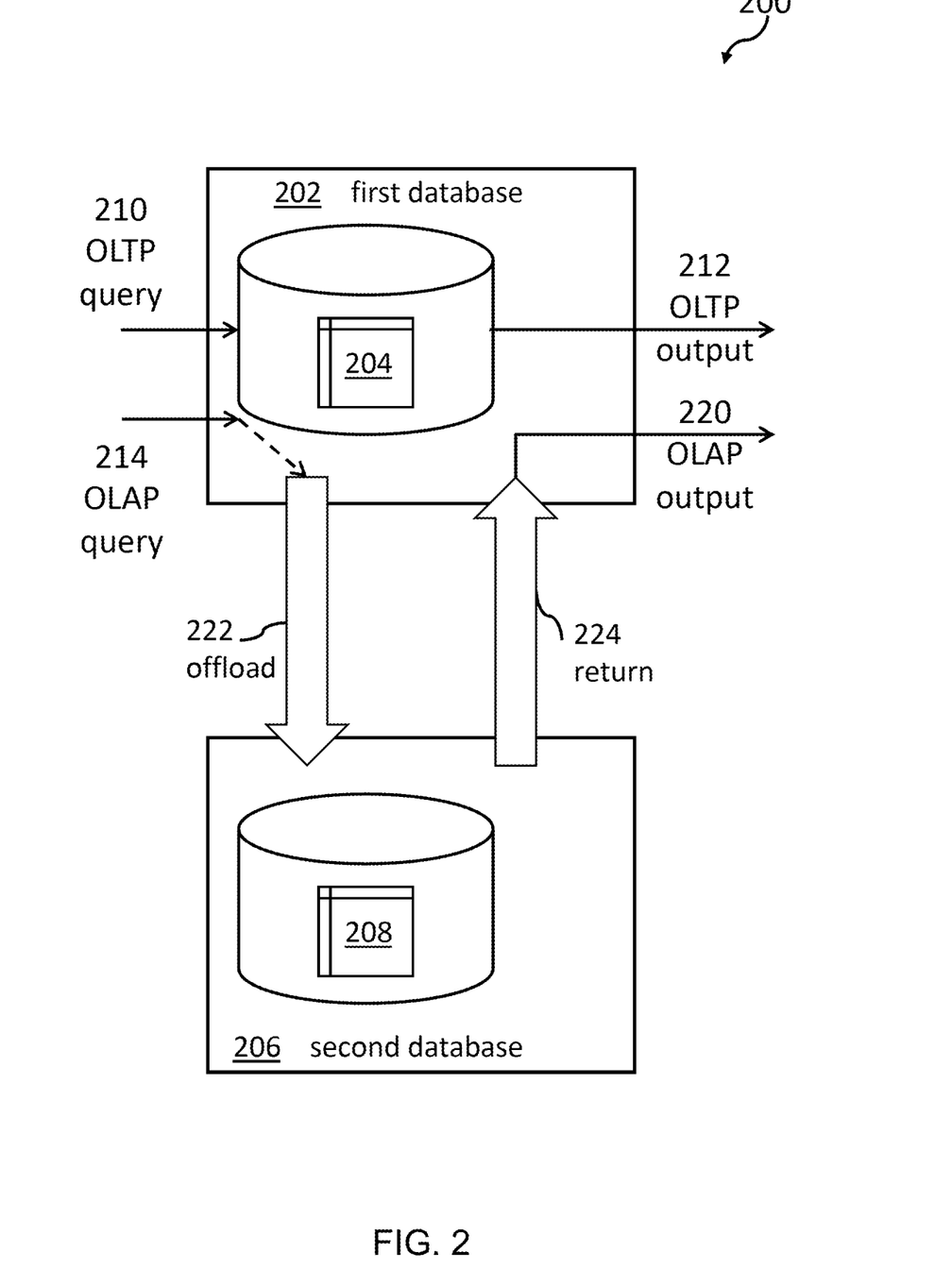
FIG. 2 shows a block diagram of an embodiment of linked databases in which the proposed method can be implemented advantageously.

FIG. 2 shows a block diagram of an embodiment 200 of linked databases in which the proposed method can be advantageously implemented. The first or primary or source database 202 typically receives OLTP queries 210 and OLAP queries 214. Those queries that are identified as OLAP queries 214 can be transferred or offloaded, 222, to the secondary or linked target database 206. The source database 202 comprises a plurality of tables 204 and related stored data. The target database 206 also comprises tables which represent at least a subset of the database tables 204 of the source database 202 and at least a subset of the data in a specific database table 208.

After the OLAP operation has been performed by the target database 206, the data are returned, 224, and the OLAP output 220 is returned back to the requesting program or process. OLTP queries 210 are executed directly in the source database 202 and returned as OLTP output 212 to the requesting program or process. Hence, the OLTP or source database 202 may operate at its best performance because it is not slowed down by any resource intensive OLAP queries.

Because of a potentially different data organization in the target database 206—e.g., column-oriented instead of row-oriented as in the source or OLTP database 202—the target database 206 may return, 224, OLAP results much faster than the source database 202.

Figure 3:
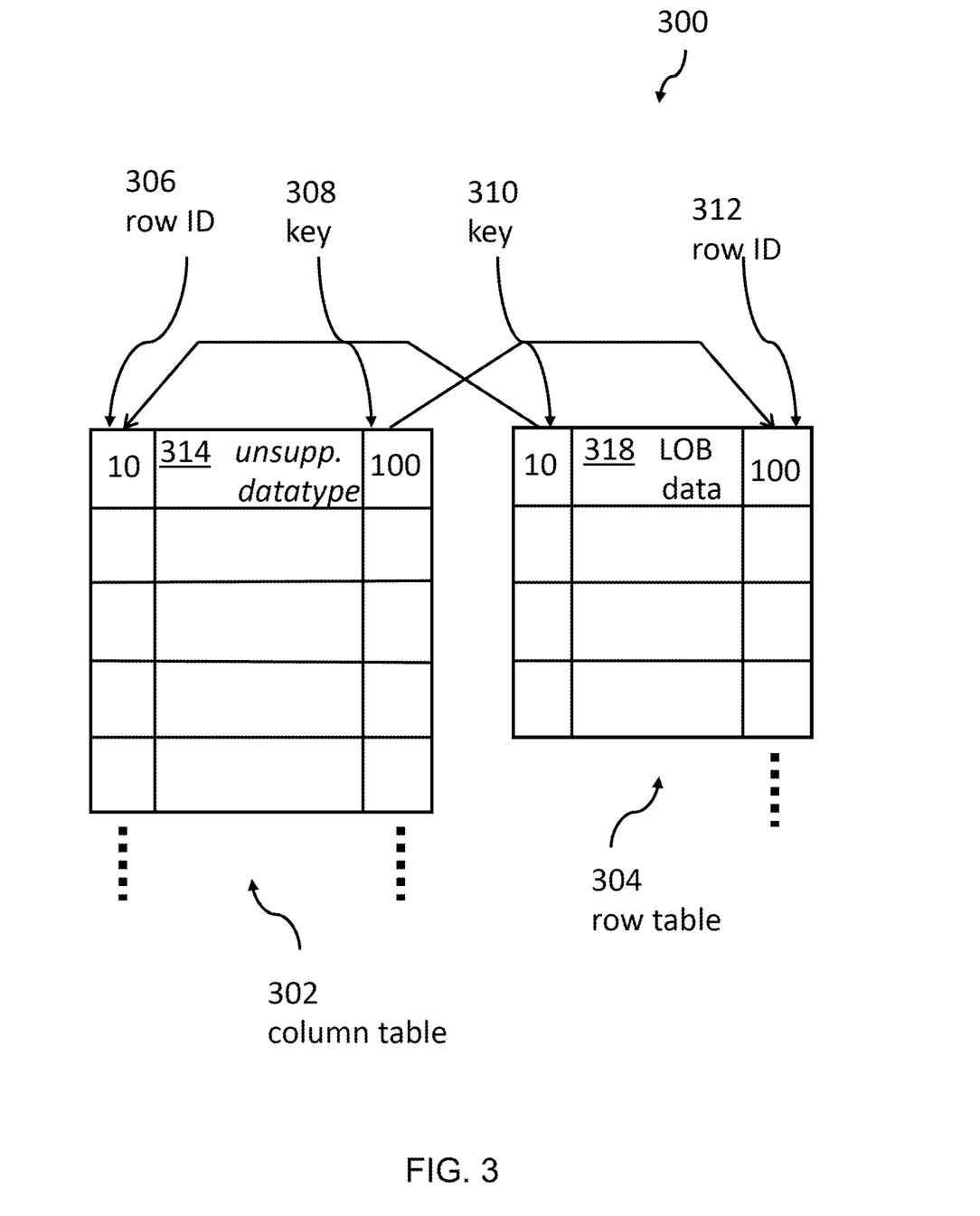
FIG. 3 shows a block diagram of an exemplary column-oriented table and a row-oriented table of the column store.

FIG. 3 shows a diagram of an embodiment of two tables of the secondary database 300. The left shown table 302 is an example for a column-oriented table 302 in the secondary database, whereas the right exemplary table shows a row-oriented table 304. Both database tables 302 and 304 are part of the secondary database. The column table 302 shows also as first entry 314 which should hold (but does not support) data of unsupported data type in the secondary database. Thereby, it should be understood, that the related table in the primary database supports these data types like spatial data, XML data and so on. However, whenever such data type should be stored in the column table 302, they are offloaded to the additional table, i.e., the row-oriented table 304, and managed row-wise. Hence, the first (or another row) entry should hold the large object data 318 that are unsupported by the base table, i.e., the column table 302. The relationship between the base table 302 and the additional table 304 is supported by a row-identifier relationship technique.

The column table 302 comprises, beside its key 308 and its own row identifier, also a new row ID (identifier), 306. On the other side, the row table 304 comprises also a row key 310 and (besides its own row identifier) a row additional ID 312 pointing back to the related row of the base table 302. This way, a 1:1 relationship can be established within the column store (compare FIG. 2, 206) between the column table 302 and the row table 304.

It should also be noted that the row table 304 only stores large object data, wherein the column table 302 stores mainly supported data types. Although reference numeral 314 refers to "unsupported data type", these data are not stored in the column table 302 but only in the related additional table, i.e., row table 304. Furthermore, the base table, i.e., the column table 304 holds, as hidden column, the row ID 312 of the documents of unsupported data type in the additional table. Symmetrically, in the additional table, i.e., the row table 304, there is also a hidden column storing the row ID 306 of the base table. In both cases, this works as a foreign key without constraints.

When inserting data, firstly, the supported data types will be inserted into a related row in the base table 302. Then, the data of unsupported data type will be inserted into a row of the row-oriented table 304. The row ID 312 of the row store table 304 will be stored in the "key" column of the base table 302, and vice versa. This allows elegantly linking both tables together so that the data can be easily queried.

To implement this new technique, queries can be automatically and transparently rewritten (or be transformed automatically) by the user to include the join of both tables so that the result set is the same as if the row-oriented table 304 did not exist. For example, given the originally query
SELECT a, b, c FROM table1 WHERE a=1,
predicates are integrated to join both column-oriented table 302 and row-oriented table 304:
SELECT a, b, c FROM table1-column-store LEFT JOIN table2-row-store ON table1-column-store.key=table2-row-store.rowid WHERE a=10;
An insert operation can be handled in the following way:
Step 0—Start a new transaction;
Step 1—Insert normal data into the base table, i.e., the column table 302;
Step 2—Insert the data of unsupported data type XML into the row-oriented table 30 with an additional column containing the row ID 306 of the data inserted in the base table, i.e., the column table 302;

Step 3—Select the row ID of the data of unsupported data type;

Step 4—Update the base table, i.e., the column table 302 to insert the row ID of the data of unsupported data types into it.

Step 5—Commit the transaction, or rollback in case of errors.

Delete operations may be executed in a similar manner:

Step 0—Start a new transaction;

Step 1—In the base table 302, select the row ID 306 of the data of unsupported data type to be deleted in the row-table 304. This can be achieved by using the predicates of the delete and projecting the row ID column;

Step 2—Delete the tuples portion of data of unsupported data type in the row table 304 using the row ID from Step 1;

Step 3—Delete the tuples portion in the base table 302;

Step 4—Commit the transaction, or rollback in case of errors.

Last but not least, also updates to database entries may be handled as follows: If the data being updated concerns supported data types stored in the base table 302, the base table 302 is updated directly. If the data of unsupported data type should be updated, the key 308 from the base table 302 is retrieved to identify the record in the row-oriented table 304; then, the UPDATE statement to include a WHERE-clause with matches the ROW-ID (e.g., WHERE table1.key=table2.ROWID and table1.key=10) is rewritten. If the update affects both, supported and unsupported data types, a new transaction is created, the update is split into 2 statements—one for the base table 302 and one for the row-oriented table 304, as explained above—and finally the transaction is committed or, in case of an error, rolled back.

Figure 4:
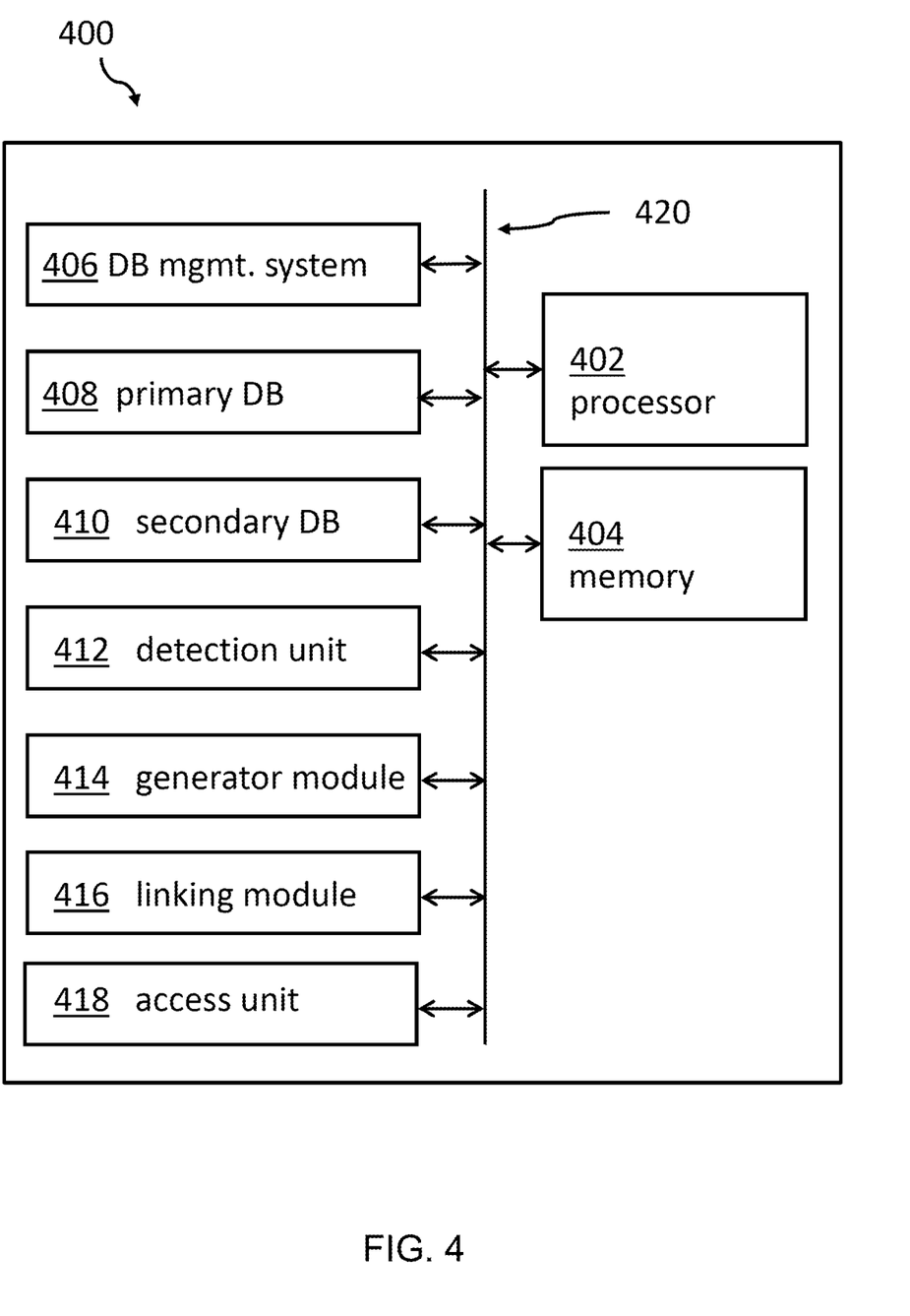
FIG. 4 shows a block diagram of an embodiment of the inventive data management system for processing an unsupported data type in a database.

FIG. 4 shows a block diagram of an embodiment of the data management system 400 for processing an unsupported data type in a database. The system 400 comprises a processor 402 and a memory 404, communicatively coupled to the processor 402, wherein the memory 404 stores program code portions that, when executed, enable the processor 402, to use a database management system 406 comprising at least a primary database 408 and at least a secondary database 410.

The processor 402 is also enabled to detect, while copying data from the primary database to the secondary database, a table for data comprising a data type that is unsupported by the secondary database. This can be achieved by a dedicated detection unit 412.

Furthermore, the processor 402 is enabled to generate—in particular, by a generator module 414—a base table in the secondary database as a copy of the detected table of the first database without the data of the unsupported data type, and to generate—in particular by the same generator module 414 or a different one—an additional table in the secondary database for data of the unsupported data type, and to link—in particular, by a linking module 416—the additional table to the base table in the secondary database via a row-identifier relationship.

Last but not least, the processor is enabled to access, while performing queries against the secondary database comprising the base table, data of the unsupported data type via the additional table. This can be performed by an access unit 418.

It shall also be mentioned that all functional units, modules and functional blocks—namely, the processor 402, the memory 404, the database management system 406, primary database 408, the secondary database 410, detection unit 412, generator module 414, linking module 416 and access unit 418—may be communicatively coupled to each other for signal or message exchange in a selected 1:1 manner. Alternatively the functional units, modules and functional blocks can be linked to a system internal bus system 420 for a selective signal or message exchange.

Figure 5:
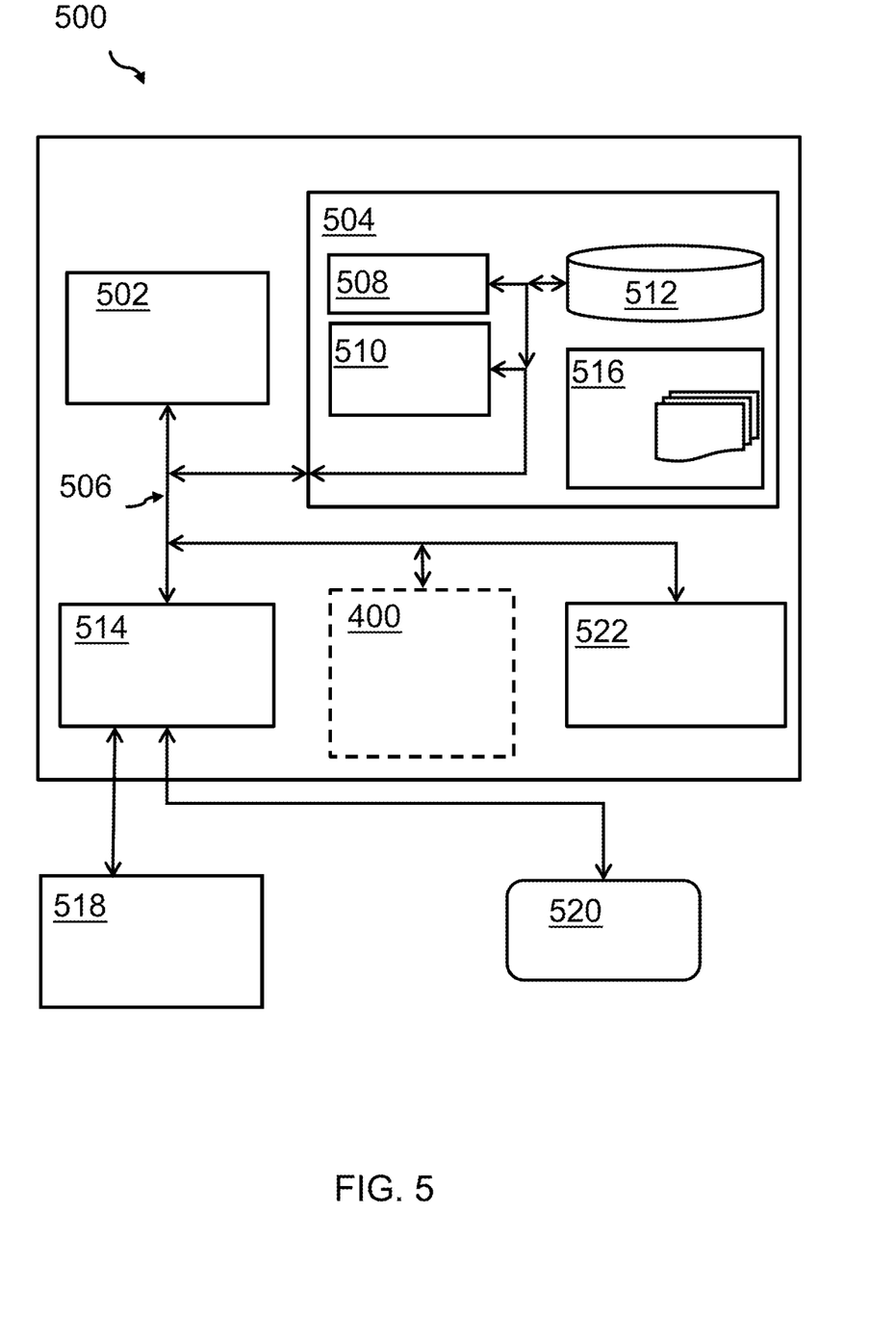
FIG. 5 shows an embodiment of a computing system comprising the system according to FIG. 4.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the data management system 400 for processing an unsupported data type in a database may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semiconductor system for a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for processing an unsupported data type in a database, the method comprising:
   providing a database management system comprising a primary database and a secondary database, wherein the primary database is a row-oriented database, and wherein the secondary database is a column-oriented accelerator portion of the database management system with support for row-oriented tables;
   copying data from the primary database to the secondary database, wherein the copying comprises:
   detecting, in the primary database, a table for data comprising a data type that is unsupported by the secondary database;
   generating a column-oriented base table in the secondary database as a copy of the detected table of the primary database;
   generating a row-oriented additional table in the secondary database;
   linking the row-oriented additional table to the column-oriented base table in the secondary database via a row-identifier relationship;
   inserting data of the supported data type from the detected table into the column-oriented base table; and
   inserting data of the unsupported data type from the detected table into the row-oriented additional table;
   receiving queries against the primary database, wherein the queries comprise an online analytical processing (OLAP) query and an online transaction processing (OLTP) query;
   in response to the receiving the OLAP query, offloading the OLAP query to be executed by the secondary database; and
   executing the OLAP query by the secondary database, wherein the executing comprises accessing data of the unsupported data type via the row-oriented additional table;

wherein the column-oriented base table comprises: an entry that corresponds to, but does not contain, data of the unsupported data type; and
a key column storing a row ID of a related entry in the row-oriented additional table; and
the row-oriented additional table comprises: in the related entry, the corresponding data of the unsupported data type; and
a key column storing a row ID of the entry in the column-oriented base table.

2. The method according to claim 1, wherein the unsupported data type comprises XML-type data.

3. The method according to claim 1, wherein the unsupported data type comprises spatial data.

4. The method according to claim 1, wherein the unsupported data type comprises JSON type data.

5. The method according to claim 1, wherein the primary database is optimized for OLTP transactions and the secondary database is optimized for OLAP transactions.

6. The method according to claim 1, wherein the unsupported data type comprises large object data.

7. The method of claim 1, wherein the column-oriented base table holds, in a hidden column, a row ID of the data of the unsupported data type in the row-oriented additional table.

8. The method of claim 1, wherein the copying further comprises with the inserting the data of the unsupported data type into the row-oriented additional table, inserting an additional column containing a row ID of the data of the supported data type inserted into the column-oriented base table;
selecting a row ID of the data of the unsupported datatype in the row-oriented additional table; and
updating the column-oriented base table to include the selected row ID.

9. The method of claim 1, further comprising, in response to receiving the queries, rewriting the queries to integrate predicates joining the column-oriented base table and the row-oriented additional table.

10. The method of claim 1, further comprising:
in response to the receiving the OLTP query, executing the OLTP query by the primary database;
outputting, by the secondary database, a result of the OLAP query; and
outputting, by the primary database, a result of the OLTP query.

11. The method of claim 1, further comprising updating an entry in the secondary database with data of the supported data type, wherein the updating comprises directly updating the column-oriented base table.

12. The method of claim 1, further comprising updating an entry in the secondary database with data of the unsupported data type, wherein the updating comprises:
receiving an update statement;
in response to the receiving, retrieving a key from the column-oriented base table to identify a row ID in the row-oriented additional table; and
rewriting the update statement to indicate the identified row ID.

13. A database management system, for processing an unsupported data type in a database, the database management system comprising:
a primary database, wherein the primary database is a row-oriented database;
a secondary database, wherein the secondary database is a column-oriented accelerator portion of the database management system with support for row-oriented tables; and
a processor and a memory, communicatively coupled to the processor, wherein the memory stores program code portions that, when executed, enable the processor to:
copy data from the primary database to the secondary database, wherein the program code portions enabling the processor to copy the data comprise program code portions that, when executed, enable the processor to:
detect, in the primary database, a table for data comprising a data type that is unsupported by the secondary database;
generate a column-oriented base table in the secondary database as a copy of the detected table of the primary database;
generate a row-oriented additional table in the secondary database;
link the row-oriented additional table to the column-oriented base table in the secondary database via a row-identifier relationship;
insert data of the supported data type from the detected table into the column-oriented base table; and
insert data of the unsupported data type from the detected table into the row-oriented additional table;
receive queries against the primary database, wherein the queries include an online analytical processing (OLAP) query and an online transaction processing (OLTP) query;
in response to the receiving the OLAP query, offload the OLAP query to be executed by the secondary database; and
access, by the secondary database while executing the OLAP query performing queries against the secondary database comprising the base table, the data of the unsupported data type via the row-oriented additional table;
wherein the column-oriented base table comprises: an entry that corresponds to, but does not contain, data of the unsupported data type; and
a key column storing a row ID of a related entry in the row-oriented additional table; and
the row-oriented additional table comprises: in the related entry, the corresponding data of the unsupported data type; and
a key column storing a row ID of the entry in the column-oriented base table.

14. The database management system according to claim 13, wherein the unsupported data type comprises XML-type data.

15. The database management system according to claim 13, wherein the unsupported data type comprises spatial data.

16. The database management system according to claim 13, wherein the unsupported data type comprises JSON type data.

17. The database management system according to claim 13, wherein:
the secondary database is optimized for OLAP; and
the primary database is optimized for OLTP transactions.

18. The database management system according to claim 13, wherein the unsupported data type comprises large object data.

19. A computer program product for processing an unsupported data type in a database, the computer program product comprising a computer readable storage medium having program instructions embodied therewith, the program instructions being executable by one or more computing systems or controllers to cause the one or more computing systems to:
- provide a database management system comprising a primary database and a secondary database, wherein the primary database is a row-oriented database and the secondary database is a column-oriented accelerator portion of the database management system with support for row-oriented tables;
- copy data from the primary database to the secondary database, wherein the program instructions causing the one or more computing systems to copy the data comprise program instructions causing the one or more computing systems to:
- detect in the primary database, a table for data comprising a data type that is unsupported by the secondary database;
- generate a column-oriented base table in the secondary database as a copy of the detected table of the primary database;
- generate row-oriented additional table in the secondary database;
- link the row-oriented additional table to the column-oriented base table in the secondary database via a row-identifier relationship;
- insert data of the supported data type from the detected table into the column-oriented base table; and
- insert data of the unsupported data type from the detected table into the row-oriented additional table;
- receive queries against the primary database, wherein the queries include an online analytical processing (OLAP) query and an online transaction processing (OLTP) query;
- in response to the receiving the OLAP query, offload the OLAP query to be executed by the secondary database;
- access, by the secondary database while executing the OLAP query, data of the unsupported data type via the row-oriented additional table;
- in response to the receiving the OLTP query, directly execute the OLTP query by the primary database;
- output, by the secondary database, a result of the OLAP query; and
- output, by the primary database, a result of the OLTP query;
- wherein the column-oriented base table comprises: an entry that corresponds to, but does not contain, data of the unsupported data type; and
- a key column storing a row ID of a related entry in the row-oriented additional table; and
- the row-oriented additional table comprises: in the related entry, the corresponding data of the unsupported data type; and
- a key column storing a row ID of the entry in the column-oriented base table.

* * * * *